(12) United States Patent
Gramm et al.

(10) Patent No.: US 7,826,197 B2
(45) Date of Patent: Nov. 2, 2010

(54) MODULAR ENERGY STORAGE DEVICE AND METHOD OF MAKING THE SAME

(75) Inventors: Scott Gramm, Surrey (CA); Clay Braziller, Vancouver (CA); Grant Farrell, Gilbert, AZ (US)

(73) Assignee: EaglePicher Technologies, Joplin, MO (US)

( * ) Notice: Subject to any disclaimer, the term of this patent is extended or adjusted under 35 U.S.C. 154(b) by 396 days.

(21) Appl. No.: 11/934,747

(22) Filed: Nov. 3, 2007

(65) Prior Publication Data

US 2008/0106849 A1    May 8, 2008

Related U.S. Application Data

(60) Provisional application No. 60/864,330, filed on Nov. 3, 2006.

(51) Int. Cl.
*H01G 9/00*    (2006.01)
(52) U.S. Cl. .................. 361/502; 361/503; 361/504; 361/509; 361/512; 361/525
(58) Field of Classification Search .......... 361/502, 361/503–504, 508–512, 305, 516–519, 523–528, 361/540–541
See application file for complete search history.

(56) References Cited

U.S. PATENT DOCUMENTS

| | | | | |
|---|---|---|---|---|
| 4,952,465 A | * | 8/1990 | Harris et al. | 429/60 |
| 6,137,053 A | * | 10/2000 | Andou et al. | 174/50.56 |
| 6,268,996 B1 | * | 7/2001 | Landsgesell | 361/540 |
| 6,845,003 B2 | * | 1/2005 | Oyama et al. | 361/502 |
| 7,307,830 B2 | * | 12/2007 | Gallay et al. | 361/502 |
| 7,426,103 B2 | * | 9/2008 | Nozu et al. | 361/502 |
| 7,474,519 B2 | * | 1/2009 | Stockman | 361/502 |
| 7,474,520 B2 | * | 1/2009 | Kashihara et al. | 361/502 |
| 7,667,952 B2 | * | 2/2010 | Allain et al. | 361/502 |

* cited by examiner

*Primary Examiner*—Nguyen T Ha
(74) *Attorney, Agent, or Firm*—Armstrong Teasdale LLP

(57) ABSTRACT

A modular energy storage device comprises a customer-defined parameter, such as electrical capacity, a can that has a dimension based on the customer-defined parameter, an electrode package that has properties based on the customer-defined parameter, and a header that has a configuration that is not dependent on the customer-defined parameter. A method for producing the modular energy storage device comprises generating a standardized energy storage device configuration, receiving a customer-defined parameter, and modifying the standardized energy storage device configuration according to the customer-defined parameter. The step of modifying the standardized energy storage device configuration comprises the steps of modifying the electrode package without modifying the location of the current collectors, modifying the length of the can according to the customer-defined parameter, and using the header already developed to complete construction of the modular energy storage device.

11 Claims, 7 Drawing Sheets

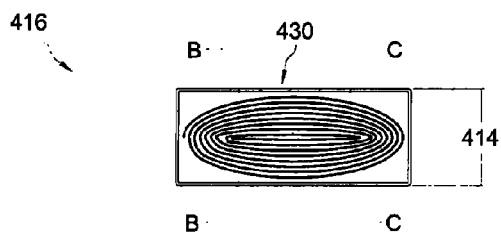
SECTION A-A
FIG. 4A
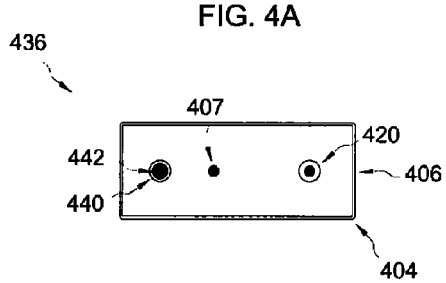
FIG. 4B
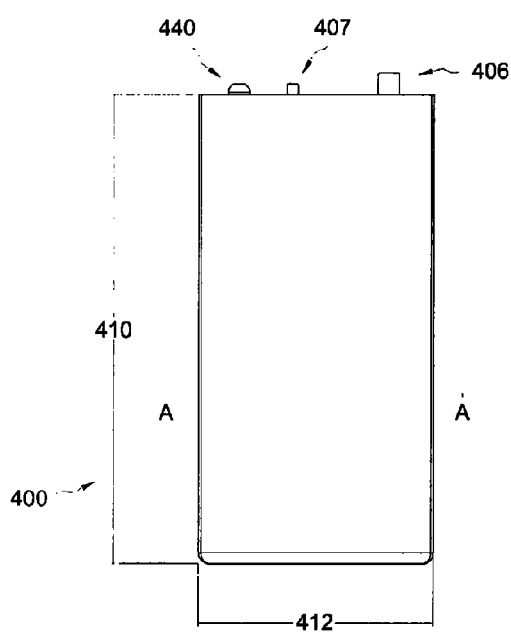
FIG. 4C
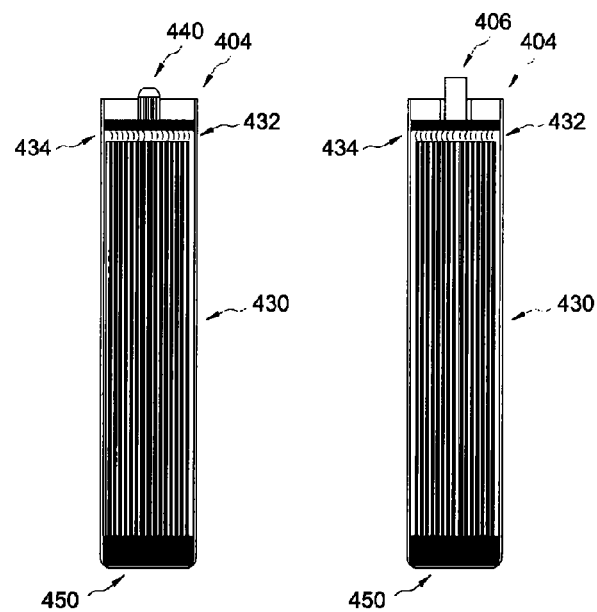
SECTION B-B
FIG. 4D
SECTION C-C
FIG. 4E

MODULAR ENERGY STORAGE DEVICE AND METHOD OF MAKING THE SAME

CROSS REFERENCE TO RELATED APPLICATIONS

This application claims priority to and the benefit of U.S. Provisional Application Ser. No. 60/864,330, filed on Nov. 3, 2006, and entitled MODULAR IMPLANTABLE DEVICE.

FIELD OF INVENTION

Embodiments of the present invention relate to energy storage devices, and more particularly to energy storage devices having a modular structure that are adaptable to being used within implantable medical apparatus.

BACKGROUND

Throughout recent years, implantable medical apparatus have been used more and more frequently to diagnose and treat medical conditions. These implantable apparatus require a power source to function. External power sources may be used in some circumstances, such as when the patient wears a battery pack outside of his body that powers an apparatus implanted in his body. Such external power sources can be cumbersome and inconvenient. Therefore, many implantable medical apparatus use energy storage devices that are themselves implantable with the medical apparatus.

These implantable energy storage devices, however, have some drawbacks. For example, it is generally difficult to replace an expired energy storage device because a physically-intrusive procedure is required. Also, because implantable medical apparatus are generally required to be quite small, implantable energy storage devices must also be much smaller than external energy storage devices. Therefore, implantable energy storage devices need to be designed to account for the desired lifetime of the implantable medical apparatus, to provide the necessary power over that desired lifetime, and to fit within the implantable apparatus. Such design specifications generally require extended design, development, testing, and production cycles—in some cases, it may take more than five years from the determination of initial design specifications for an implantable energy storage device ultimately to go into production. Some factors that lead to long product development cycles are designing, testing, and refining (i) the chemistry for the electrodes in the energy storage device, (ii) the mechanical assembly of the energy storage device (e.g., overall shape of the energy storage device, placement of the electrodes, connection of the electrodes to the terminals, etc.), and (iii) the manufacturing and mass-production processes for the energy storage device.

For example, the connections formed between the terminals of the energy storage device and the electrodes typically are complex. Furthermore, the space required to house these connections reduces the energy density of the energy storage device (i.e., the more space required for the connections, the less space available for the active elements of the energy storage device such as the electrodes). The research, development, and testing that is involved in producing an energy storage device is thus vital to achieving an efficient design of the energy storage device. Such research, development, and testing of a new energy storage device configuration can be lengthy and expensive.

It is therefore desirable to reduce these product development cycles in order to allow an energy storage device for the implantable medical apparatus to become available more quickly. In order to reduce these product development cycles, it is important to reduce the time associated with the different steps in the cycle. Creating a modular implantable energy storage device in which the chemistry, mechanical assembly, and/or production processes have already been proven, and wherein only small changes are required to adapt the modular device to a particular application, will result in substantially reduced product development cycle times.

SUMMARY

Exemplary embodiments of the present invention comprise modular energy storage devices and methods for making the modular energy storage devices. An exemplary modular energy storage device comprises (i) a customer-defined parameter, such as electrical capacity, (ii) a can that has a dimension based on the customer-defined parameter, (iii) an electrode package that has properties based on the customer-defined parameter, and (iv) a header that has a configuration that is not dependent and/or based on the customer-defined parameter. In accordance with one aspect of an exemplary embodiment of the invention, the header is configured to minimize a head space between the header and the electrode package so as to maximize energy density within the modular energy storage device.

An exemplary method for producing the modular energy storage device comprises the steps of (i) generating a standardized energy storage device, (ii) receiving a customer-defined parameter, and (iii) modifying the standardized energy storage device according to the customer-defined parameter. In accordance with one aspect of an exemplary embodiment, the step of generating a standardized energy storage device comprises the steps of (i) developing a chemical configuration for the electrodes, (ii) developing a mechanical configuration that includes the type of can, the electrode configuration, and the header configuration, and (iii) developing a manufacturing process for the standardized energy storage device. In accordance with another aspect of an exemplary embodiment, the step of developing the header configuration comprises the steps of developing the head space configuration that includes connections between the energy storage device terminals and the electrode current collectors.

In accordance with an exemplary embodiment of the invention, after the customer-defined parameter is received, the step of modifying the standardized energy storage device comprises the steps of modifying the electrode package without modifying the location of the current collectors, modifying the length of the can according to the customer-defined parameter, and using the header already developed to complete construction of the modified, modular energy storage device. Exemplary energy storage devices are thus modular energy storage devices in that they may be modified in accordance with any number of different customer-defined parameters, but the same header may be employed across many parameters.

BRIEF DESCRIPTION OF THE DRAWING FIGURES

The figures in this document illustrate various embodiments that may include part or all of the features shown in one of these figures, or may include features from two or more figures. Embodiments may also include features described in the specification, or limitations to features described in the specification. Furthermore, embodiments may include features that would be familiar to a person of ordinary skill in the art who has studied this document.

FIG. 4A illustrates a cross sectional view of an energy storage device according to an exemplary embodiment of the present invention.

FIG. 4B illustrates a top view of the energy storage device illustrated in FIG. 4A.

FIG. 4C illustrates a side view of the energy storage device illustrated in FIG. 4A.

FIG. 4D illustrates a side, cross sectional view of the energy storage device illustrated in FIG. 4A.

FIG. 4E illustrates another side, cross sectional view of the energy storage device illustrated in FIG. 4A.

DETAILED DESCRIPTION

The detailed description of various exemplary embodiments herein makes reference to the accompanying drawing figures. While these embodiments are described in sufficient detail to enable those of ordinary skill in the art to practice the invention, it should be understood that other embodiments may be realized and that changes may be made without departing from the spirit and scope of this disclosure. Thus, the detailed description herein is presented for purposes of illustration only and not of limitation. For example, the steps recited in any of the method or process descriptions may be executed in any order and are not limited to the order presented unless otherwise specified in the claims or the specification.

For the sake of brevity, certain apparatus and systems (and components of the individual operating components) may not be described in detail herein. Furthermore, the connecting lines shown in the various drawing figures contained herein are intended to represent exemplary functional relationships and/or physical couplings between the various elements. It should be noted that many alternative or additional functional relationships or physical connections may be present in a practical system.

In the following detailed description, numerous specific details are set forth to provide a thorough understanding of claimed subject matter. However, it will be understood by those skilled in the art that claimed subject matter may be practiced without these specific details. In other instances, well-known methods, procedures, and/or components have not been described in detail.

Exemplary embodiments of a modular energy storage device comprise a can, an electrode package, a can header, and a terminal. In accordance with one aspect of an exemplary embodiment, the can is configured to form the body and profile of the energy storage device. One or more dimensions of the can may be modified to conform to a customer-defined parameter, such as an electrical capacity of the energy storage device. The electrode package is formed from two types of electrodes, e.g., cathodes and anodes, and is configured to fit within the can. In accordance with an aspect of an exemplar embodiment, the electrode package is configured to exhibit a customer-defined electrical capacity. An exemplary can header may comprise one or more terminals, such as a positive and negative terminal, and the can header may further comprise a plurality of connections between the terminal(s) and the electrode package. The configuration of an exemplary can header may be independent of the customer-defined parameter, such that the research, development, and testing of the exemplary can header and the connections between the terminal and the electrode package may be applicable to a wide variety of energy storage devices, thereby reducing costs and development time of a customized modular energy storage device.

Figure 1:
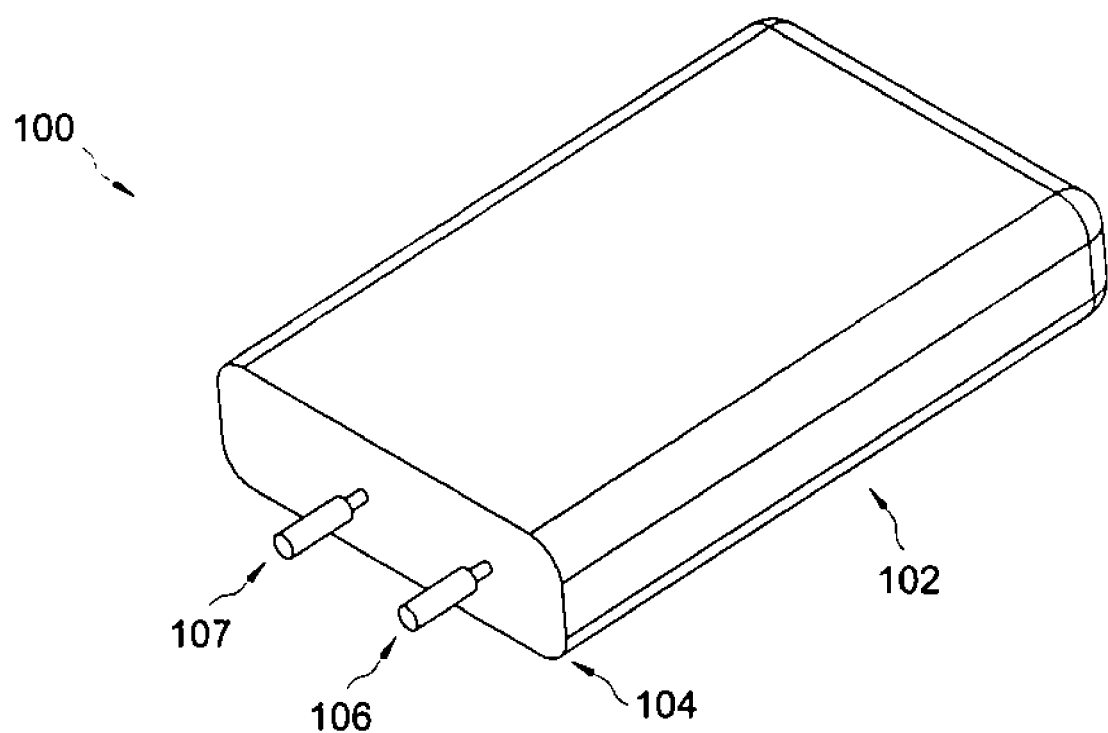
FIG. 1 illustrates a perspective view of a modular energy storage device according to an exemplary embodiment of the present invention.
Figure 2A:
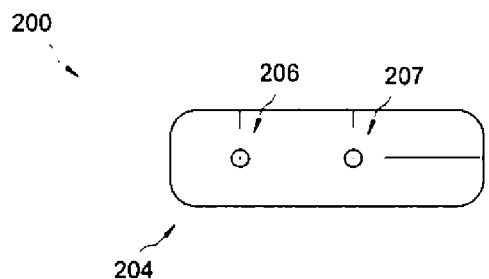
FIG. 2A illustrates a top view of a modular energy storage device according to an exemplary embodiment of the present invention.
Figure 2B:
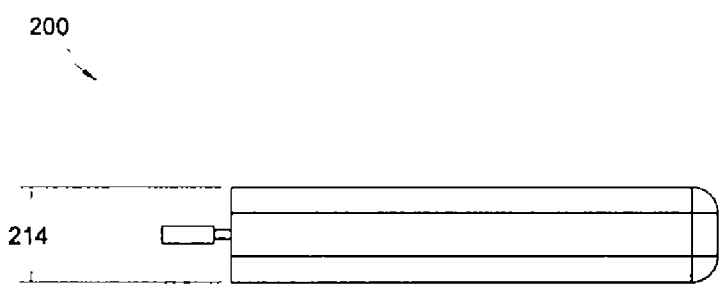
FIG. 2B illustrates a side view of the modular energy storage device illustrated in FIG. 2A.
Figure 2C:
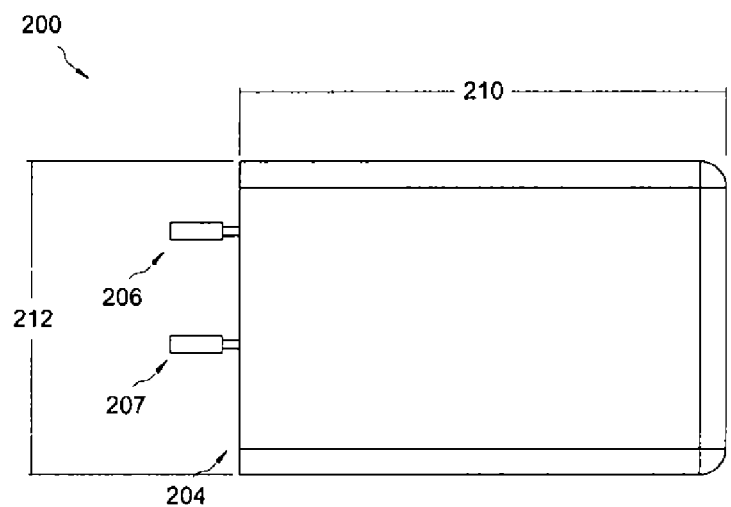
FIG. 2C illustrates another side view of a modular energy storage device illustrated in FIG. 2A.

With reference to FIGS. 1-3, an exemplary energy storage device 100 may comprise a battery, capacitor, or other type of energy storage device. Energy storage device 100 may comprise a can 102 that is configured to receive the electrodes, an electrolyte, an insulator, and other internal components of energy storage device 100. Energy storage device 100 may further comprise a header 104 that comprises terminals 106 and 107. Terminals 106 and/or 107 may be configured to connect to the electrodes, for example, positive, negative, cathode, and/or anode electrodes. Energy storage device 100 is configured to allow electrons to flow between terminals 106 and 107 in order to, for example, supply power to an implantable medical apparatus.

With reference to FIG. 2, exemplary modular energy storage device 200 may comprise dimensions 210, 212, and 214. These dimensions (or a subset thereof) may be altered to allow modular energy storage device 200 to be adapted in accordance with a customer-defined parameter. In other embodiments of the invention, modular energy storage device 200 may be adapted in accordance with two or more customer-defined parameters, where the customer-defined parameters may reflect energy requirements, size requirements, and/or other customer requirements. As used throughout this disclosure and the claims, where one customer-defined parameter is mentioned, it is understood that any number of customer-defined parameters may influence the development of the modular energy storage device. As such, the size, energy density, electrical capacity, and/or other aspects of energy storage device 200 may be changed in accordance with the customer-defined parameter(s), however some individual components may be pre-tested and pre-proven such that an already-determined manufacturing process may be used in many configurations. This adaptability may allow the individual components that require more development time and cost to be reused, and only minimal changes need to be made to modular energy storage device 200. This modularity may allow the design, manufacture, and/or approval process time of modular energy storage device 200 to be shortened.

In accordance with further embodiments of the invention, and with reference to FIG. 4, the electrodes may be formed into an electrode package 430. An exemplary electrode package 430 may be configured to produce the customer-defined parameter, e.g., electrical capacity, energy density, size, shape, and/or other parameters of interest to a customer. An exemplary customized electrode package may be based on a standardized electrode package. For example, the standardized electrode package may be formed by taking two strips of electrode material and winding the strips together to form a "jelly roll"-type electrode package. Exemplary current collectors 432 are configured to be attached to the electrodes so that current collectors 432 may be attached to terminals 406, 407 and fit within a can head space 434 according to a configuration of can header 404.

The customized electrode package may be formed by removing electrode material from the electrode strips without changing the location and/or configuration of current collectors 432. For example, each electrode may have a length and a width, and the length may be held constant while the width is modified in accordance with the customer-defined parameter. Such a configuration requires that only one dimension of electrode package 430 be modified so that a cross section of electrode package 432 remains substantially constant over a range of customer-defined electrical capacities. This exemplary customization and/or modularization allows the electrical capacity of energy storage device 400 to be modified according to the customer-defined electrical capacity or other parameter for the modular energy storage device.

Figure 5A:
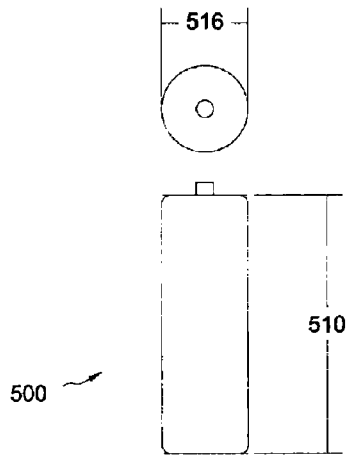
FIG. 5A illustrates a top view and a side view of one configuration of an energy storage device according to an embodiment of the present invention.
Figure 5B:
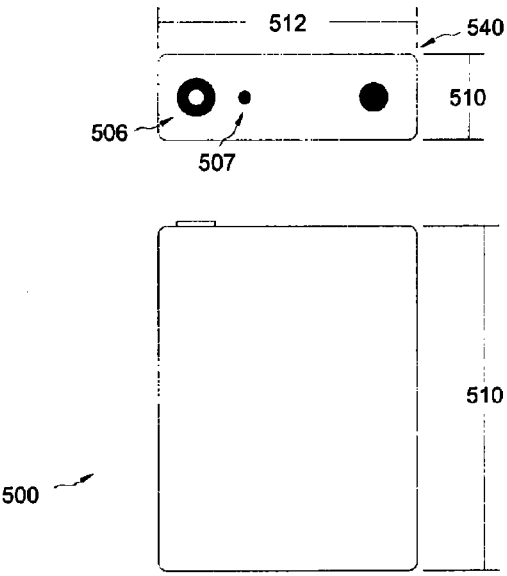
FIG. 5B illustrates a top view and a side view of another configuration of an exemplary energy storage device.
Figure 5C:
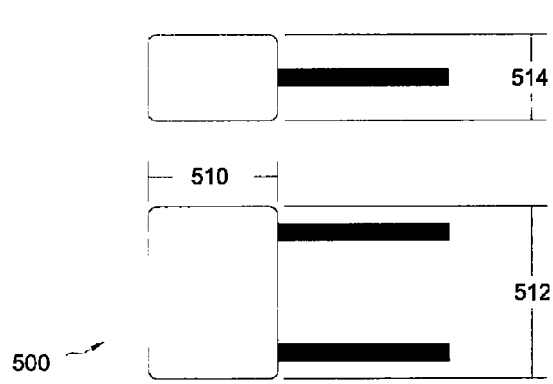
FIG. 5C illustrates two side views of a configuration of an exemplary energy storage device.
Figure 5D:
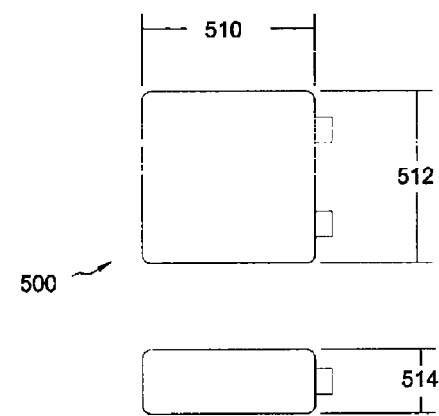
FIG. 5D illustrates two side views of a further configuration of an exemplary energy storage device.
Figure 5E:
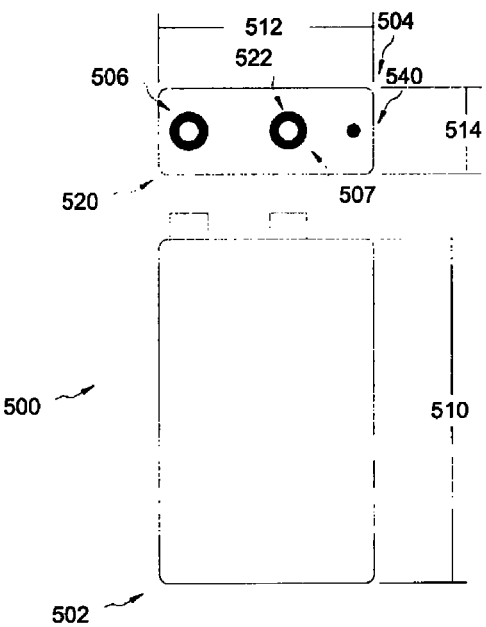
FIG. 5E illustrates another top view and a side view of a further configuration of an exemplary energy storage device.
Figure 5F:
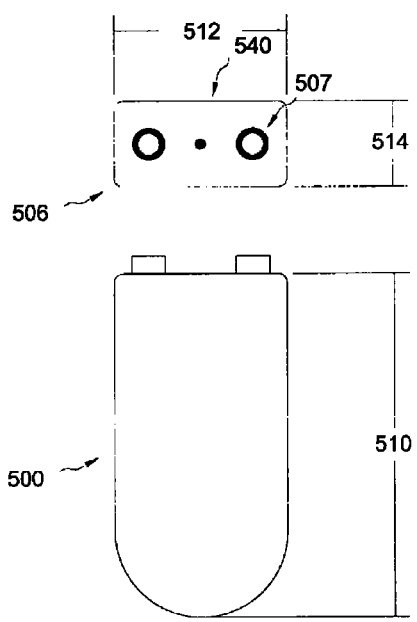
FIG. 5F illustrates yet another top view and a side view of a further configuration of an exemplary energy storage device.
Figure 5G:
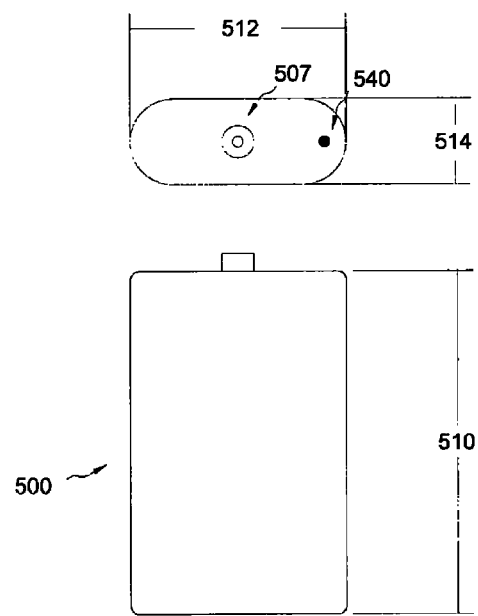
FIG. 5G illustrates still another top view and a side view of a further configuration of an exemplary energy storage device.

With the width of each electrode modified, the two electrodes may be wound together to form the jelly roll configuration (see, e.g., electrode package 432). Other embodiments of the invention, however, comprise electrode packages that have other configurations, such as bobbin (see e.g., energy storage device 500 in FIG. 5D), slug (see e.g., energy storage device 500 in FIG. 5A), stack plate configurations (see e.g., energy storage device 500 in FIG. 5F), other configurations and combinations thereof. In fact, all electrode configurations now known and hereafter developed are contemplated within the scope of the present invention. Such electrode configurations may be customized according to a customer-defined parameter without the need for completely redesigning energy storage device 400—specifically, can header 404, the terminal locations of terminals 406, 407, can head space 434, and/or current collector 432 connections need not be modified. In other embodiments, however, some of these elements may be modified while others are not.

In connection with the exemplary customized electrode package, a customized energy storage device can may be configured to house the customized electrode package. An exemplary can comprises a cross section 416 (e.g., SECTION A-A in FIG. 4A) and a can length 410, wherein can length 410 is configured so that the customized electrode package, defined substantially by the modified width of the electrode strips, fits within can 402. The exemplary can 402 may be formed by deep draw stamping, resulting in a can with a substantially constant cross section 416 and a length 410 that may be modified as desired. While length 410 of can 402 may be of any desired dimension, for example, length 410 of a stamped can 402 may be 20 millimeters. Where a can length of only 10 millimeters is desired, the 20 millimeter can may be cut to 10 millimeters. In other embodiments, can 402 may be formed at the desired length 410 where no cutting is required. Any number of manufacturing processes may be used to produce a can 402 in accordance with various embodiments of the present invention.

With continued reference to FIG. 4, an exemplary electrode package 430 comprises an elliptically wound electrode package. In other embodiments, the cross section of electrode package 430 may comprise an elongated oval. In still other embodiments, the cross section of electrode package 430 may comprise any shape configured to increase the energy density of energy storage device 400 or otherwise conform to desired parameters, specifications, or design or performance features. For example, where energy storage device 400 comprises a can 402 that has an elongated rectangular cross section as in FIG. 4, electrode package 430 may be flattened to substantially fill cross section 416 of can 402. Such a configuration reduces space in can 402 that is not filled by active portions of energy storage device 400, thereby increasing the energy density of energy storage device 400. In still other embodiments, however, where energy density may not be of interest, the non-active space within can 402 need not be minimized.

According to another exemplary embodiment of the present invention, modular energy storage device 400 comprises a can header 404. Can header 404 may comprise one or more terminals 406, 407 at corresponding terminal locations, a plurality of terminal connectors that facilitate connecting current collectors 432 to terminals 406, 407, an electrolyte fill hole 440, and/or a fill hole sealing member 442. As discussed above, exemplary can headers 404 are configured to minimize the head space 434 in the can required to make the connections between terminals 406, 407 and electrode package 430. A considerable portion of the development time and cost for a modular energy storage device goes in to designing, testing, and proving the can header and minimizing the head space. Thus, exemplary embodiments of the invention comprise can headers that may be used with any number of can-electrode configurations, such that the same can header may be used with a variety of customer-defined parameters. Because the exemplary can header may be used for a number of energy storage device configurations, the time and cost for developing and proving new energy storage device configurations is greatly reduced.

Exemplary can headers 404 comprise a cross section perimeter 436 that is substantially the same as the perimeter of cross section 416 of can 402. Furthermore, exemplary can headers 404 may comprise a glass insulator 420 that provides electrical insulation between terminal 406 and can header 404. With momentary reference to FIG. 5E, header 504 may comprise a glass insulator 520, 522 for each terminal 506, 507. With reference back to FIG. 4, can 402 may comprise the negative terminal of energy storage device 400, and terminal 407 may be configured to be the lead for the negative terminal, as discussed further hereinbelow.

In accordance with one aspect of an exemplary embodiment of the invention, a glass insulator 420 may be secured to terminal 406 and can header 404 by a glass-to-metal seal. These glass-to-metal seals are expensive, require special tooling and equipment to perform, and require extensive time to develop, test, and prove. Exemplary embodiments of the invention provide can header 404 configurations where the terminal location and the location of glass insulator 420 and the glass-to-metal seal is not dependent on a customer-defined parameter. Thus, embodiments of the present invention do not require different configurations of glass-to-metal seals for each new modular energy storage device configuration, and these embodiments provide for greatly-reduced development and testing time and cost for the modified modular energy storage devices.

According to still other embodiments of the invention, and with continued reference to FIG. 4, energy storage device can 402 may comprise one terminal of energy storage device 400—e.g., the negative terminal. Where can 402 comprises the negative terminal, the can header 404 may be configured to comprise a pin 407 and/or be stud welded to the header that functions as the lead for the negative terminal. According to further exemplary embodiments, and with reference to FIG. 3, where can 302 comprises the negative terminal, the entire can may comprise the negative terminal, and a pin, stud, or other lead may not be required. In yet other exemplary embodiments, and with reference to FIGS. 1, 2, and 5E, can 102, 202, 502 may not comprise the negative terminal, but the negative terminal may be configured to appear substantially similar to the positive terminal and to be secured to header 104, 204, 504 via glass insulators 520, 522 using a glass-to-metal seal. In still other exemplary embodiments, can 402 may be configured to comprise the positive terminal of energy storage device 400, such that pin 407 may function as the lead for the positive terminal and/or the entire can 302 may comprise the positive terminal.

In accordance with other exemplary embodiments of the present invention, the unmodified can header is attached to the modified can and electrode package. For example, the header may be laser welded and/or ultrasonically welded to the can. Other methods to attach the can to the header may be used that aid in preventing the electrolyte from leaking out of the energy storage device. In other embodiments, the header may be sealed to the can, such that the modular energy storage device is hermetically sealed.

Figure 3A:
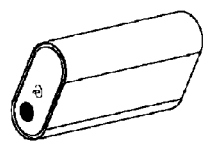
FIG. 3A illustrates a perspective view of another modular energy storage device according to an embodiment of the present invention.
Figure 3B:
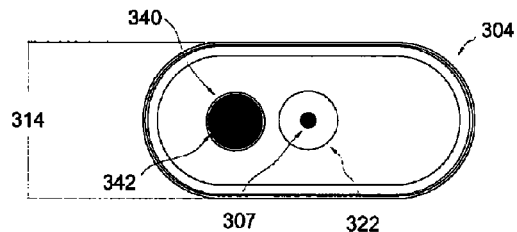
FIG. 3B illustrates a top view of a modular energy storage device as in FIG. 3A.
Figure 3C:
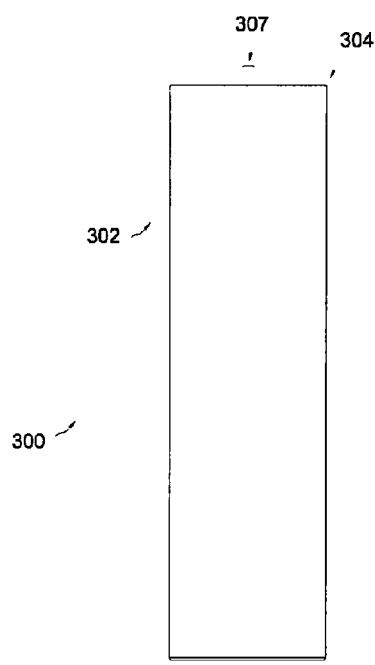
FIG. 3C illustrates a side view of the modular energy storage device illustrated in FIG. 3A.
Figure 3D:
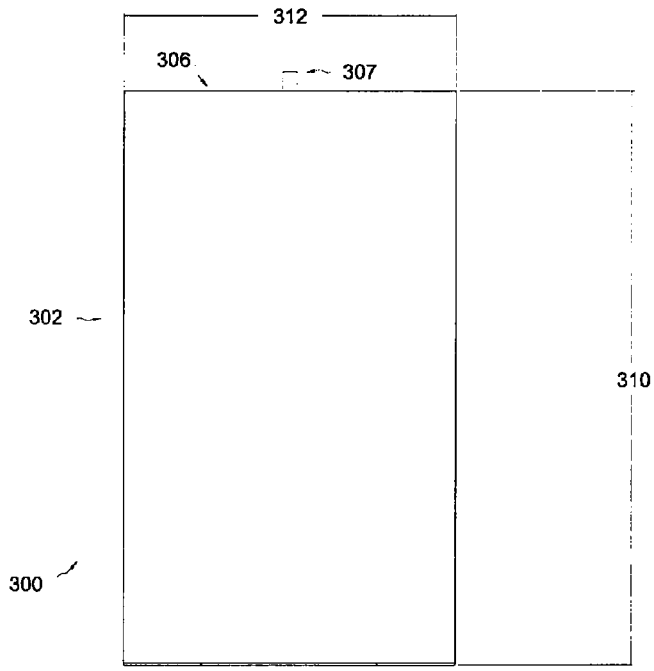
FIG. 3D illustrates another side view of a modular energy storage device illustrated in FIG. 3A.

Still other embodiments of the invention, with reference to FIGS. 3B and 4D, comprise a fill hole 340, 440 in header 304, 404, where an electrolyte may be introduced into energy storage device 300, 400. In other embodiments, the fill hole may be located in the can. After the electrolyte is introduced, a sealing member 342, 442 may be introduced into fill hole 340, 440 and then sealed, e.g., by laser and/or spot welding. In other embodiments, the fill hole may be closed by any other method that is configured to aid in preventing leakage of the electrolyte and introduction of impurities into the electrolyte. Further configurations and locations of exemplary fill holes 540 are illustrated in FIGS. 5B and 5E-5G.

A method of developing an energy storage device according to an exemplary embodiment of the invention will now be discussed. This exemplary method will be discussed in connection with the development of a modular battery; however, other embodiments of the invention contemplate production of other energy storage devices, such as modular capacitors. All types of energy storage devices that may be produced according to this exemplary method are contemplated within the scope of the present invention.

Figure 6:
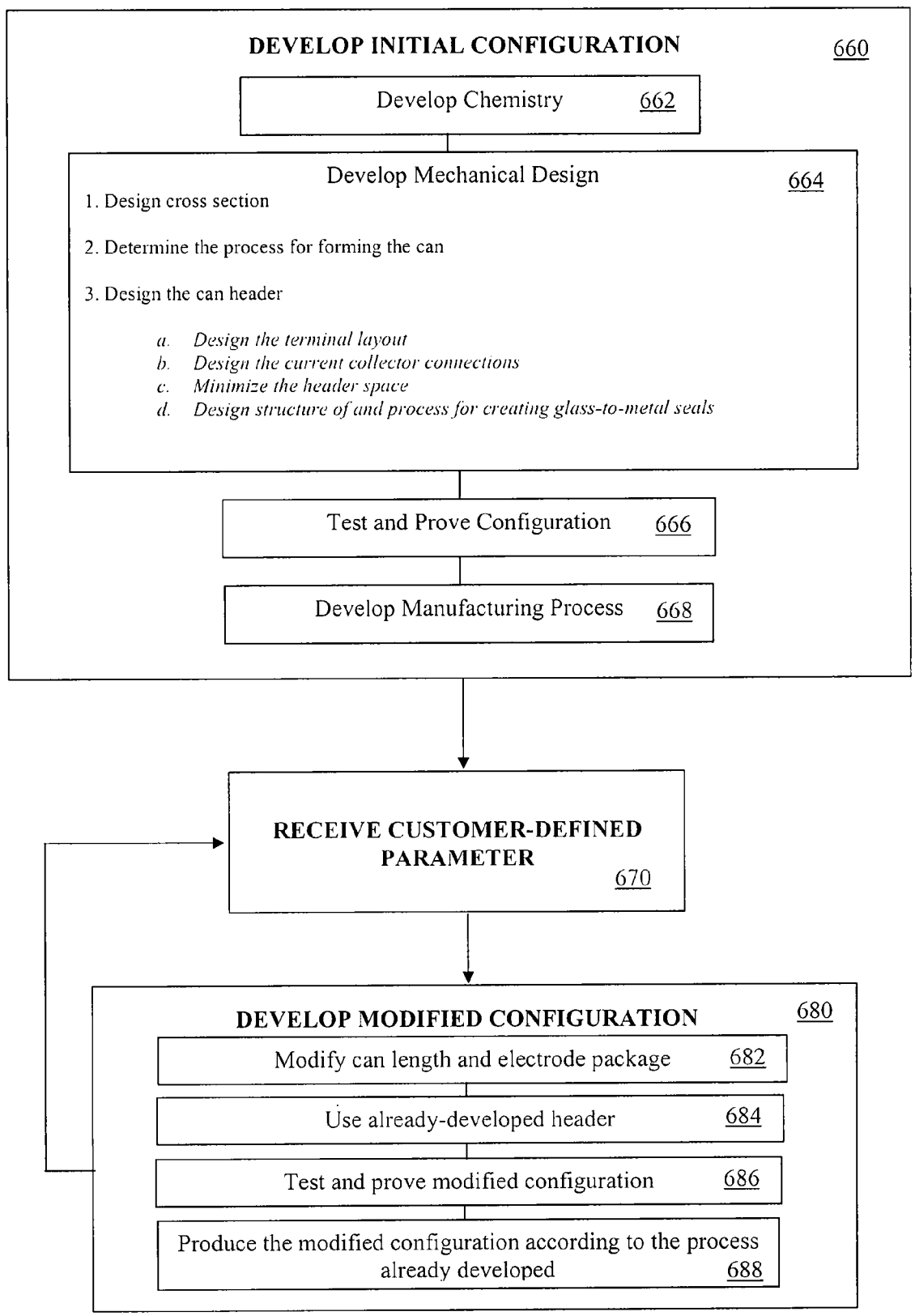
FIG. 6 illustrates a flow diagram of a method of designing, testing, and producing an energy storage device according to an exemplary embodiment of the present invention.

With reference to FIG. 6, the exemplary method of producing the modular battery comprises the steps of developing an initial configuration for the modular battery 660, testing and proving the initial configuration 666, receiving a customer-defined parameter 670, developing a modified configuration 680 based on the customer-defined parameter, testing and proving the modified configuration 686, and producing the modified configuration of the modular battery 688.

Developing the initial configuration of the battery comprises the steps of developing an electrode chemistry 662, developing a mechanical design for the battery 664, testing the battery 666, and developing a manufacturing process for producing the battery 668. Many types of battery chemistries are known and contemplated within the scope of the present invention. Exemplary chemistries may comprise lithium ion, $SOCl_2$, $CF_x$, and other chemistries now known and hereafter developed. However, different applications may require different chemistries that are not currently known. These unknown chemistries are also contemplated within the scope of the present invention. Exemplary embodiments of the present invention provide battery chemistries that have been developed, tested, and proven prior to modularization of the battery; therefore, these expensive and time consuming processes need not be carried out for every modification of the modular battery.

An exemplary process for developing the mechanical design 664 of the battery comprises developing a cross section for the battery, developing a process for forming the battery can based on the cross section, and developing a header having the cross section. An exemplary cross section is one that will lead to a high energy density within the battery can. For example, a flattened oval cross section will allow the electrode package to fill the battery can more completely, as discussed above. With momentary reference to FIG. 4, an exemplary can 402, as also discussed above, is configured to be adaptable to a number of lengths 410, while maintaining the cross section shape 416, in order to accommodate a number of customer-defined parameters. For example, the process for forming the battery can may comprise deep drawing, molding, casting, and other manufacturing techniques that produce a substantially constant cross section over the length of the battery can.

Developing an exemplary header may be one of the most time consuming and expensive steps in the modular battery development process. As mentioned above, designing the layout of the terminals and the connections between the current collectors and the terminals, developing tooling for the glass to metal seals, and minimizing the head space, among other factors, add to the complexity of the header. Exemplary embodiments of the present invention, therefore, provide standardized headers that may be used for any number of modular battery configurations. The header may be configured to have substantially the same cross section perimeter as the battery can. This exemplary configuration thus allows variations of the modular battery can to have a plurality of lengths while being able to utilize the same header. Such flexibility greatly reduces the time and expense involved in the battery development process.

After the battery chemistry and mechanical configuration have been developed, sample batteries may be assembled to test and prove the basic version of the modular battery 666. Various characteristics of the battery may be tested, such as electrical capacity and electrical density. Such characteristics may be tested for different electrode widths and battery can lengths. Testing at different widths and lengths may provide data to allow a customer to choose an appropriate basic modular battery configuration. Testing the basic version of the battery reduces the development time and expense of modifications of the basic configuration, because such modifications will have already been tested.

Following the testing of the basic modular battery configuration, manufacturing processes and tooling may be developed to automatically, substantially automatically, manually, and/or combinations thereof to produce the basic modular battery configuration 668 (see, e.g., FIGS. 5A-5G for exemplary modular battery configurations). Manufacturing process and tooling may also be developed to modify the basic configuration in accordance with anticipated customer requirements.

Further exemplary embodiments of the method herein described allow customers to specify a customer-defined parameter 670, such as electrical capacity, and choose an appropriate basic battery configuration that is configured to achieve that parameter. Other exemplary embodiments of the invention allow customers to specify a plurality of customer-defined parameters for modification of the modular energy storage device. For example, if a customer needs an electrical capacity of 100 milliamp-hours (mAh), he may choose a basic configuration that has a range of 55-114 mAh. Other ranges for basic configurations may comprise 140-300 mAh, 350-570 mAh, and 500 microamp-hours to 3.5 amp-hours. After choosing the basic configuration, the modular battery may be modified to produce the desired electrical capacity by modifying the width of the electrodes and the length of the battery can 682. The header of the basic configuration need not be modified in exemplary embodiments 684. In some embodiments, modifications to the tooling may be required to produce the customized modular battery; however, the time to develop such tooling is minimal compared to the scenario where an entirely new header may need to be developed. Another exemplary step of the method of the present invention provides that the modified battery may be tested to ensure its compliance with the customer-defined parameter 686. Such testing is much more limited than the testing that would be required for a traditional, newly-developed battery. After this limited testing, the modified battery may be produced for delivery to the customer 688.

Still other embodiments of the invention will allow customers to develop implantable medical apparatus that may be more easily customizable depending on specific medical treatment with the knowledge that modular energy storage devices according to the present invention are available. For example, a customer may develop an apparatus for neural modulation. The customer may configure the apparatus to be capable of providing different types of treatment. Since different types of treatment may require different magnitudes of energy and/or electrical capacity, the customer may design the apparatus with the presently disclosed modular energy storage device in mind. The customer may use substantially the same type of apparatus for different types of treatment merely by ordering a modular energy storage device with a higher or lower electrical capacity—the apparatus design need only to accommodate energy storage devices with different lengths because the cross section and interface with the apparatus will remain the same. Also, during early development of the customer's apparatus, samples of the energy storage device would be available so that the customer could begin designing the apparatus without needing to wait for the completed battery development process, so the battery and the apparatus may be developed contemporaneously. The customer thereby saves development costs that might have otherwise needed to be spent to develop different apparatus that accommodate different energy sources. Further improvement of successive iterations of the customer's apparatus may also be achieved based on the predictability of the performance of the modular energy storage device and the effects changes to the modular energy storage device would have on the customer's apparatus.

In the preceding description and/or following claims, the terms "coupled" and/or "connected," along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, couple may mean that two objects are in communication with each other, and/or communicate with each other, such as two pieces of software, and/or hardware, or combinations thereof.

Although the claimed subject matter has been described with a certain degree of particularity, it should be recognized that elements thereof may be altered by persons skilled in the art without departing from the spirit and/or scope of the disclosure. It is believed that the subject matter pertaining to creating, designing, and utilizing modular implantable energy storage devices and/or many of its attendant utilities will be understood by the forgoing description. Furthermore, it will be apparent that various changes may be made in the form, construction and/or arrangement of the components thereof without departing from the scope and spirit of the disclosed subject matter and without sacrificing all of its material advantages, the form herein described being merely an explanatory embodiment thereof. It is the intention of the disclosure to encompass and/or include such changes.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims and/or numbered paragraphs at the end of this disclosure. Further, no element described in this document is required for the practice of the invention unless expressly described as "essential" or "critical".

In addition, modifications may be made to the disclosed embodiments without departing from the scope of the invention. The scope of this disclosure is therefore not limited to the disclosed embodiments. In other words, other variations and modifications of embodiments will be apparent to those of ordinary skill in the art. The particular values and configurations discussed above can be varied, are cited to illustrate particular embodiments, and are not intended to limit the scope of this disclosure. It is contemplated that the implementation of the disclosed embodiments may involve components having different characteristics as long as the elements of at least one of the claims below, or the equivalents thereof, are included.

We claim:

1. A modular battery, comprising:

a customer-defined electrical capacity;

a can having a cross section perimeter independent of the customer-defined electrical capacity, and a length dependent on the customer-defined electrical capacity;

a can header comprising a first terminal, wherein the first terminal is located at a first location in the can header, and wherein the first location is independent of the customer-defined electrical capacity;

a first electrode and a second electrode disposable within the can, wherein the first electrode and the second electrode each comprise a width, a length, and a current collector, wherein the widths of the first and second electrodes are dependent on the customer-defined electrical capacity, and wherein the lengths of the first and second electrodes are independent of the customer-defined electrical capacity;

a second terminal; and a head space located between the can header and the first and second electrodes, wherein the head space comprises a current collector configuration comprising a first connection between the current collector of the first electrode and the first terminal, and a second connection between the current collector of the second electrode and the second terminal, wherein the head space is configured to be independent of the customer-defined electrical capacity.

2. A battery according to claim 1, wherein the can header further comprises a glass-to-metal seal between the first terminal and the can header.

3. A battery according to claim 1, wherein the cross section perimeter comprises a substantially rectangular cross section perimeter.

4. A battery according to claim 1, wherein the cross section perimeter comprises a substantially circular cross section perimeter.

5. A battery according to claim 1, wherein the can header further comprises an electrolyte fill hole at a fill location, wherein the electrolyte fill hole and the fill location are independent of the customer-defined energy capacity.

6. A battery according to claim 1, wherein the cross section perimeter comprises a substantially oval-shaped cross section perimeter.

7. A battery according to claim 1, wherein the first terminal comprises a positive terminal, and wherein the second terminal comprises a negative terminal.

8. A battery according to claim 7, wherein the can is the negative terminal, and wherein the battery further comprises a contact pin disposed on the can header.

9. A battery according to claim 1, wherein the first electrode and the second electrode are configured in a bobbin configuration within the can.

10. A battery according to claim 1, wherein the first electrode and the second electrode are configured in a jelly roll configuration within the can.

11. A battery according to claim 1, wherein the first electrode comprises an electrode slug.

* * * * *